(No Model.)
W. J. PERKINS.
SAW.
No. 342,535. Patented May 25, 1886.
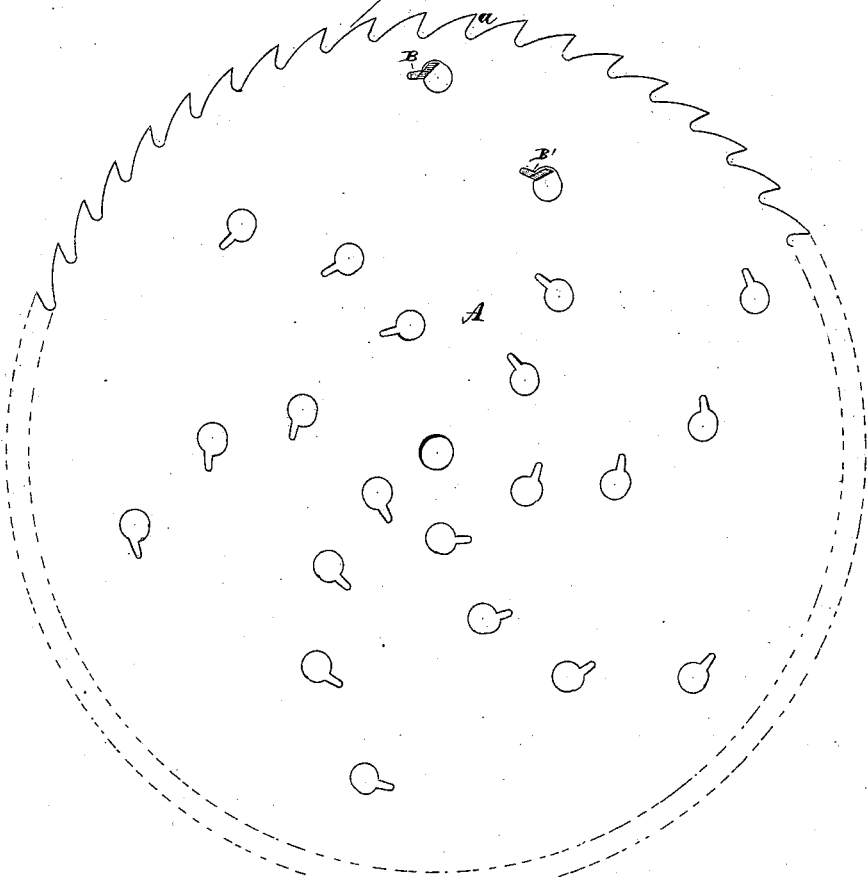
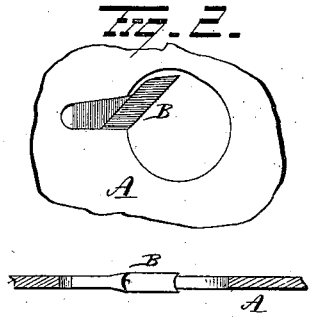
WITNESSES
INVENTOR

United States Patent Office.

WILLIS J. PERKINS, OF GRAND RAPIDS, MICHIGAN.

SAW.

SPECIFICATION forming part of Letters Patent No. 342,535, dated May 25, 1886.

Application filed November 18, 1884. Renewed January 20, 1886. Serial No. 189,178. (No model.)

*To all whom it may concern:*

Be it known that I, WILLIS J. PERKINS, of Grand Rapids, in the county of Kent and State of Michigan, have invented certain new and useful Improvements in Saws; and I do hereby declare the following to be a full, clear, and exact description of the invention, such as will enable others skilled in the art to which it appertains to make and use the same.

My invention relates to an improvement in saws.

In sawing timber lengthwise of the grain, and particularly in sawing shingle-bolts set on end and presented to the saw sidewise, the timber is liable to spring together behind the teeth and bind the saw. It has hitherto been necessary to run the bolt backward as often as the saw became bound, and advance it to the saw again to widen the cut sufficiently to allow the saw to advance through the bolt. This backing out and advance movement in many instances has to be repeated eight or ten times, and becomes a serious nuisance on account of the loss of time thereby incurred, and the consequent increase in the cost of manufacture of shingles, or whatever else the timber is designed for.

The object of my present invention is to provide a saw which will clear itself when forced through timber.

With this end in view my invention consists in a saw provided with one or more series of cutting-teeth located in the saw-plate.

My invention further consists in certain features of construction and combinations of parts, as will be hereinafter described, and pointed out in the claims.

In the accompanying drawings, Figure 1 is a view of my improved saw in side elevation, and Fig. 2 is a transverse section through the center.

A represents a circular saw-plate, provided with circumference-teeth $a$ of any approved construction. A series of teeth, B B', &c., consisting of two or more teeth, as may be found desirable, are located in or on the plate A at different distances from the center, and set to cut the same width as the teeth $a$.

I do not wish to limit myself to any particular form of arrangement of the teeth B B', &c., as further experience may prove some arrangement other than that at present adopted to be more advantageous; but at present I provide the plate A with six curved lines of teeth B B', &c.

The tooth B at the greatest radial distance from the center is located at such a distance from the saw-teeth $a$ that no extensive or troublesome inward spring of the timber can take place between the two. The outer tooth of each succeeding series is situated about the width of a tooth nearer the center than the outer tooth of the next preceding series. The second tooth, B', of the first series is about the width of a saw-tooth nearer the center than the outer tooth of the last series, and the teeth B' of the several series follow each other in the same relation as the teeth B. This arrangement of teeth has the advantage of not weakening the saw-plate, as teeth arranged at the same radial distance from the center would do, or as teeth arranged in the same radial line would do. I also prefer to so locate the several teeth B B', &c., of a series that they will correspond to circumference-teeth when the saw-plate is worn down to any one of said teeth, thus keeping the regular order of the circumference-teeth intact.

The number of series of curved lines of teeth and the number of teeth employed in a series must be determined by experiment. One or two series might be sufficient for a saw run at a very high speed, while three or more would be found advantageous in a saw run at a lower rate, and two or three teeth in a series might effect a clearance of some kinds of wood, while four or more would be required in other kinds.

The teeth B B', &c., may be formed integral with the saw by puncturing the plate and forming cutting-edges on the sides of the perforations; but I prefer to construct the teeth separately and insert them, as this admits of their being removed for sharpening, and the tension of the saw-plate is not affected by the wearing away of the tooth.

I do not wish to limit myself to the use of any particular style of inserted tooth, but propose to adapt the saw-plate to the reception of any of the forms in common use or any new form which I may find to be best adapted to the purpose.

The form shown in the drawings is one of the improved constructions which may be successfully employed; but I make no claim thereto in the present application, the same being reserved as the subject-matter of a separate application.

From the above construction it will be observed that as the saw cuts its way into the wood the body-teeth B B', &c., will cut the sides of the saw-cut as fast as the wood springs together, and thus prevent the plate from becoming cramped, and allowing the saw to advance freely through the block.

I am aware that planer-knives have been inserted in the body of a saw for the purpose of smoothing the kerf as the saw advances, and that such knives have been formed integral with the plate for the same purpose; but I am not aware that one or more series of knives or teeth set at different radial distances from the center have ever been constructed or used for the purpose of clearing the saw and preventing it from becoming cramped by the springing together of the timber.

It is evident that numerous changes in the form and arrangement of the several parts described may be made without departing from the spirit and scope of my invention; hence I do not wish to limit myself strictly to the construction herein set forth; but, Having fully described my invention, what I claim as new, and desire to secure by Letters Patent, is—

1. A saw provided with teeth located in or on the plate between the center of the plate and the outer edge thereof, and projecting from opposite sides of said plate, for the purpose of preventing the saw from binding, substantially as set forth.

2. A circular saw provided with one or more series of teeth located in or on the plate between the periphery of the saw-plate and the center thereof, and projecting from opposite sides of said plate, for the purpose of preventing the saw from binding, substantially as set forth.

3. A saw provided with one or more series of teeth in or on the sides of the saw-plate, and projecting from opposite sides thereof, each series having one or more teeth at different radial distances from the center, substantially as set forth.

4. A circular saw provided with one or more series of teeth in or on the sides of the saw-plate between the center and periphery thereof, and projecting from opposite sides thereof, each series consisting of a curved row of teeth, substantially as set forth.

5. A saw provided with one or more series of inner teeth in or on the plate between the center thereof and the outer or circumference teeth, each tooth of the series being on a line passing between a circumference-tooth and the center of the plate, whereby the inner teeth will occupy the position of circumference-teeth when the plate is worn down, substantially as set forth.

6. A saw provided with one or more series of teeth in the plate or on the sides of the plate between the center and outer or circumference teeth, the outer or circumference teeth and the inner series of teeth projecting laterally an equal distance from the sides of the saw-plate, substantially as set forth.

In testimony whereof I have signed this specification in the presence of two subscribing witnesses.

WILLIS J. PERKINS.

Witnesses:
FRED W. STEVENS,
ARTHUR C. DENISON.